United States Patent [19]
Pozzoli

[11] Patent Number: 5,743,390
[45] Date of Patent: Apr. 28, 1998

[54] CONTAINER FOR A PLURALITY OF DISCS, PARTICULARLY FOR COMPACT DISCS

[75] Inventor: Aldo Pozzoli, Inzago, Italy

[73] Assignee: Pozzoli S.p.A., Inzago, Italy

[21] Appl. No.: 783,297

[22] Filed: Jan. 10, 1997

Related U.S. Application Data

[63] Continuation of Ser. No. 498,494, Jul. 5, 1995, abandoned.

[30] Foreign Application Priority Data

Jul. 15, 1994 [IT] Italy .................. MI94A1490
Jan. 19, 1995 [IT] Italy .................. MI950025 U

[51] Int. Cl.$^6$ .................................................. B65D 85/57
[52] U.S. Cl. ................. 206/232; 206/303; 206/308.1; 206/445
[58] Field of Search ........................ 206/303, 307, 206/309–313, 308.1, 308.2, 308.3, 472, 815, 445, 232

[56] References Cited

U.S. PATENT DOCUMENTS 4,819,798  4/1989  Hasuike ............... 206/308.1
5,322,162  6/1994  Melk.

FOREIGN PATENT DOCUMENTS 0114631  8/1984  European Pat. Off. .
8625285  1/1987  Germany.
8702353  6/1987  Germany.
9215505  9/1992  WIPO.

*Primary Examiner*—Jimmy G. Foster
*Attorney, Agent, or Firm*—Guido Modiano; Albert Josif

[57] ABSTRACT

The present invention relates to a container for a plurality of discs, particularly compact discs, which comprises a tray-like body having, on its bottom, a first flat surface and a second flat surface arranged side by side and at different levels. The container comprises a first swing-out frame, pivoted to the tray and accommodatable at the first flat surface, and a second swing-out frame, pivoted to the tray and partially accommodatable on the second flat surface so that the remaining part overlaps, and is spaced from, the first frame accommodated on the first flat surface. Each frame supports two discs on opposite faces.

22 Claims, 6 Drawing Sheets

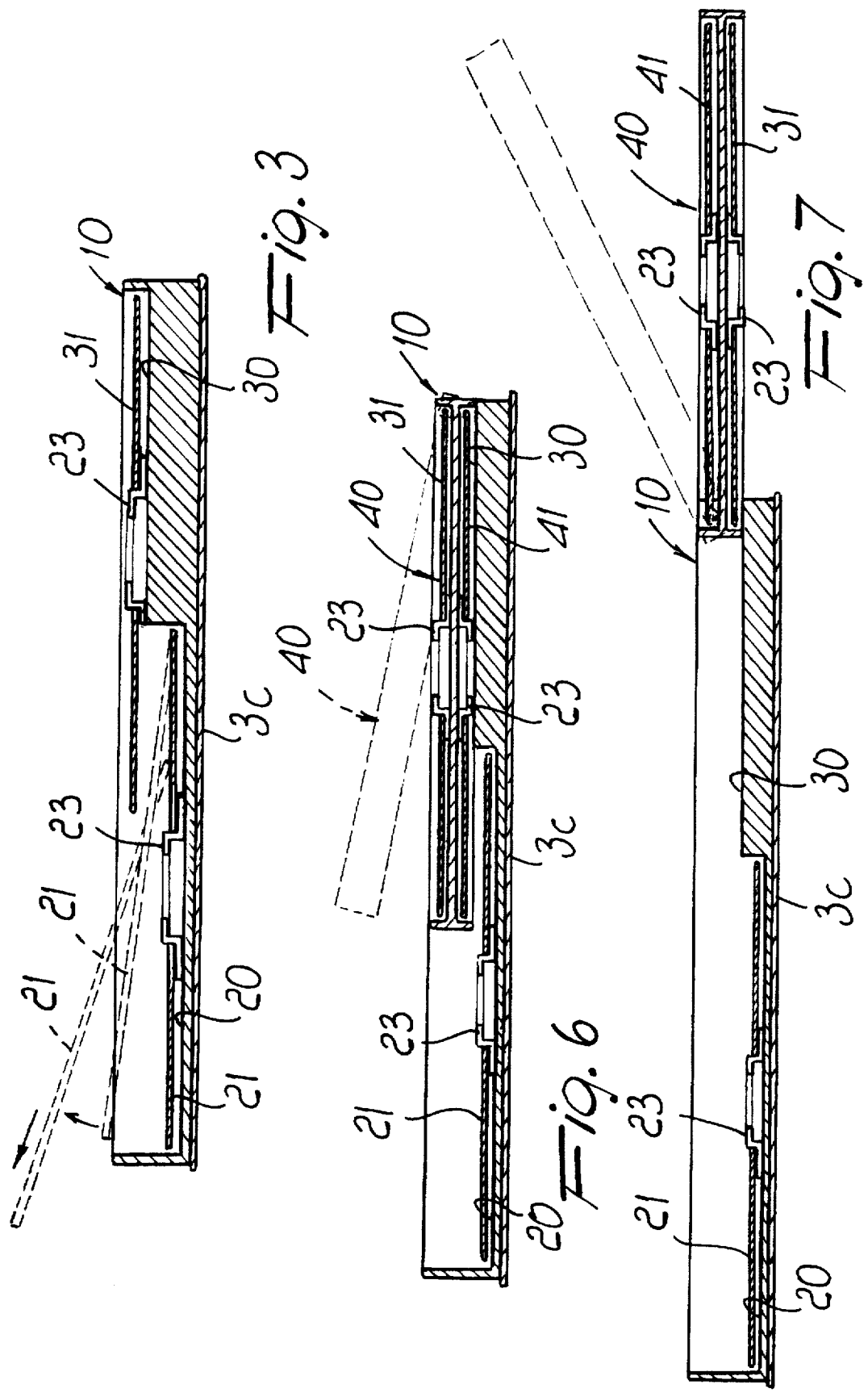

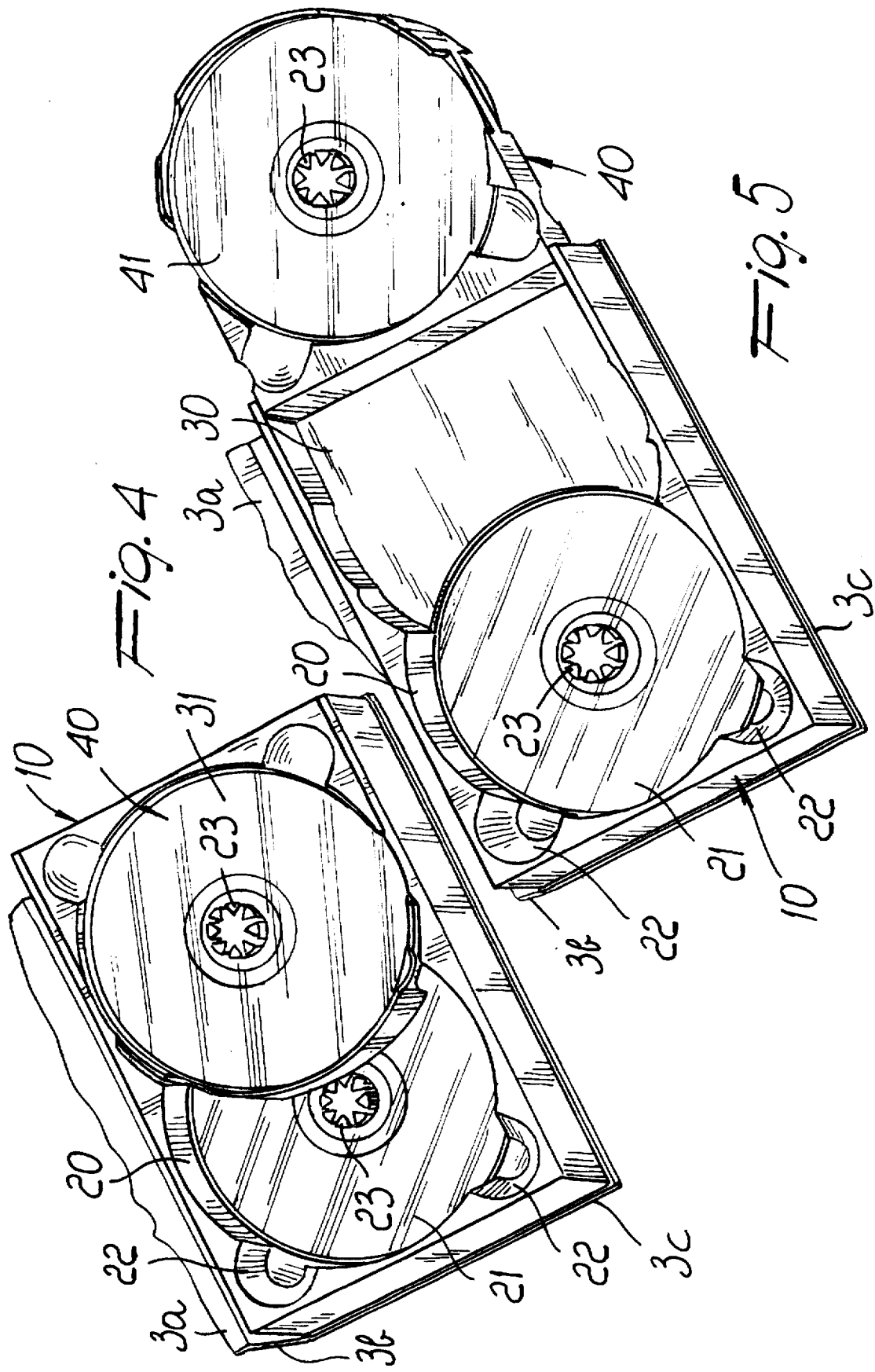

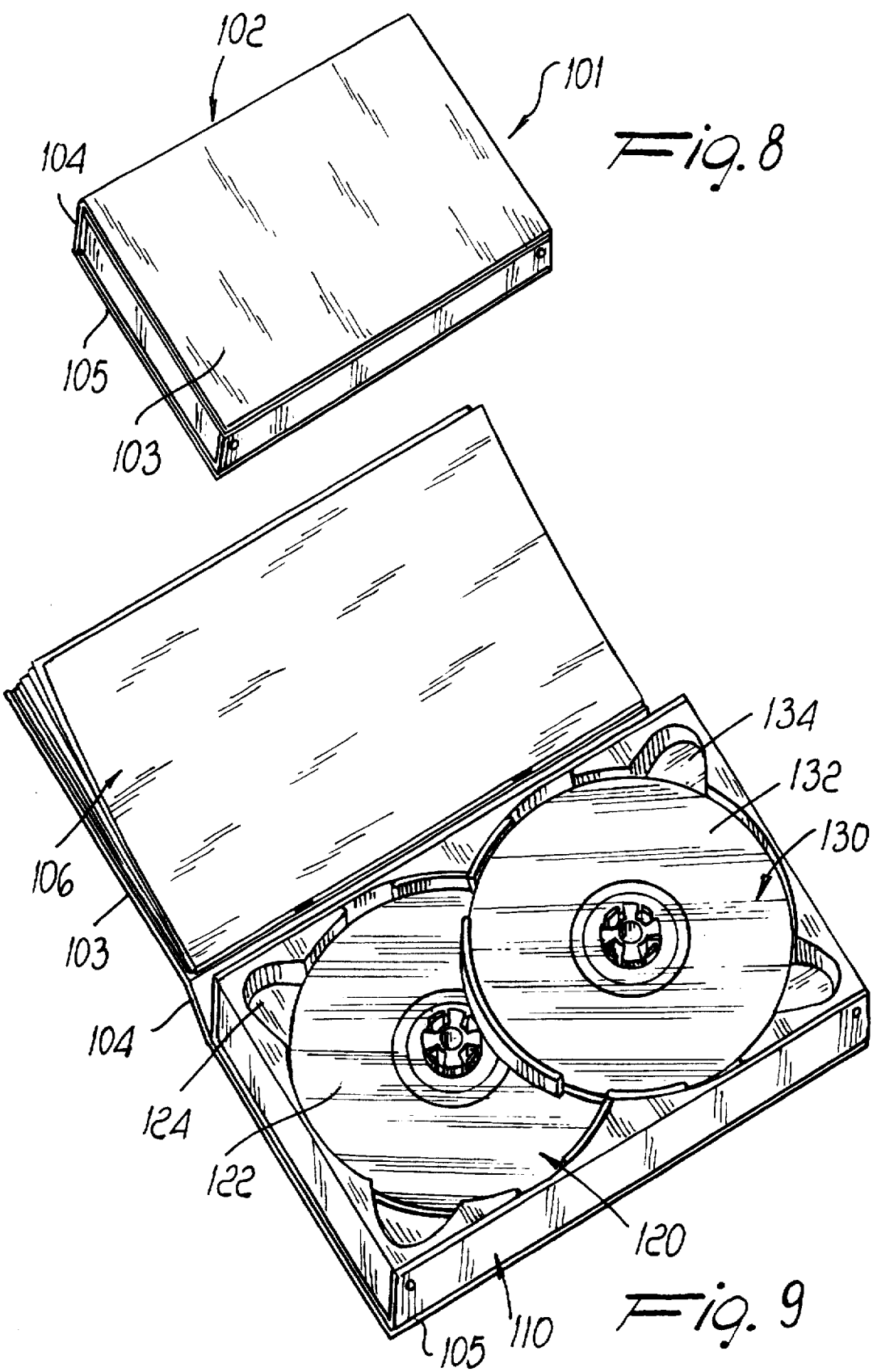

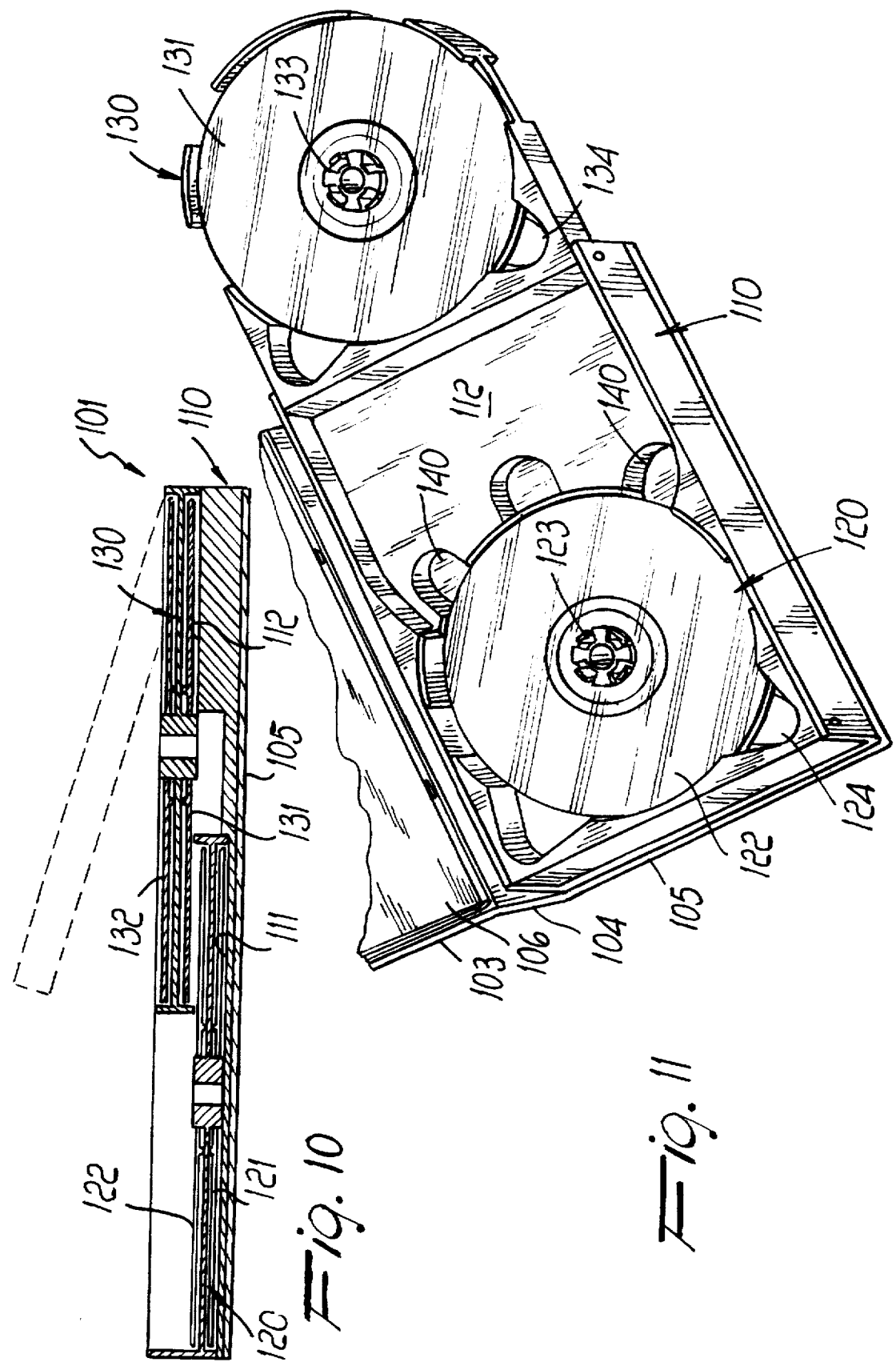

CONTAINER FOR A PLURALITY OF DISCS, PARTICULARLY FOR COMPACT DISCS

This is a continuation application of application Ser. No. 08/498,494 filed on Jul. 5, 1995, now abandoned.

BACKGROUND OF THE INVENTION

The present invention relates to a container for a plurality of discs, particularly compact discs.

It is known that containers for a plurality of compact discs are generally constituted by a tray-like body that forms the side-by-side recesses or seats for accommodating the compact discs.

This arrangement causes the dimensions of the container to have a 2-to-1 ratio, so that said container assumes external dimensions that in addition to being scarcely effective from an aesthetic point of view are often awkward, since they do not allow to easily place the container in the areas where it is to be held.

SUMMARY OF THE INVENTION

The aim of the present invention is to solve the problem described above, by providing a container for a plurality of discs that allows to accommodate two or more discs and allows to remove them individually and to reduce the external dimensions, thus making it easier and simpler to position said container in the areas where it is to be held.

Within the scope of this aim, a particular object of the invention is to provide a container in which the external dimension ratio is such as to provide, in addition to a pleasant aesthetic effect, an easier use of the container.

Another object of the invention is to provide a container that, by virtue of its particular constructive features, gives the greatest assurances of reliability and safety in use.

Still another object of the invention is to provide a container that is obtainable starting from commonly commercially available elements and materials and is furthermore competitive from a merely economic point of view.

This aim, these objects, and others which will become apparent hereinafter are achieved by a container for a plurality of discs, particularly compact discs, according to the present invention, which comprises a tray-like body defining the seats for accommodating at least two discs, characterized in that said tray-like body defines a first region for accommodating a first disc and at least a second region for accommodating at least a second disc, said second region being located at a higher level than said first region, said at least second disc being arranged so that it partially overlaps said first disc and is spaced therefrom.

BRIEF DESCRIPTION OF THE DRAWINGS

Further characteristics and advantages will become apparent from the description of two preferred but not exclusive embodiments of a container for a plurality of compact discs, illustrated only by way of non-limitative example in the accompanying drawings, wherein:

FIG. 3 is a sectional view of the container for two discs;

FIG. 4 is a schematic perspective view of a container for three discs, shown in open position;

FIG. 5 is a schematic perspective view of a container for three discs, with the second and third discs hinged out;

FIG. 6 is a sectional view of the container for three discs;

FIG. 7 is a sectional view of the container for three discs, with the second and third discs hinged out;

FIG. 8 is a schematic perspective view of the container for four compact discs, in closed position;

FIG. 9 is a perspective view of the container of FIG. 8, with the front flap open;

FIG. 10 is a sectional view, taken along a longitudinal median plane;

FIG. 11 is a perspective view of the container with one frame in swung-out position;

DESCRIPTION OF THE PREFERRED EMBODIMENTS

Figure 1:
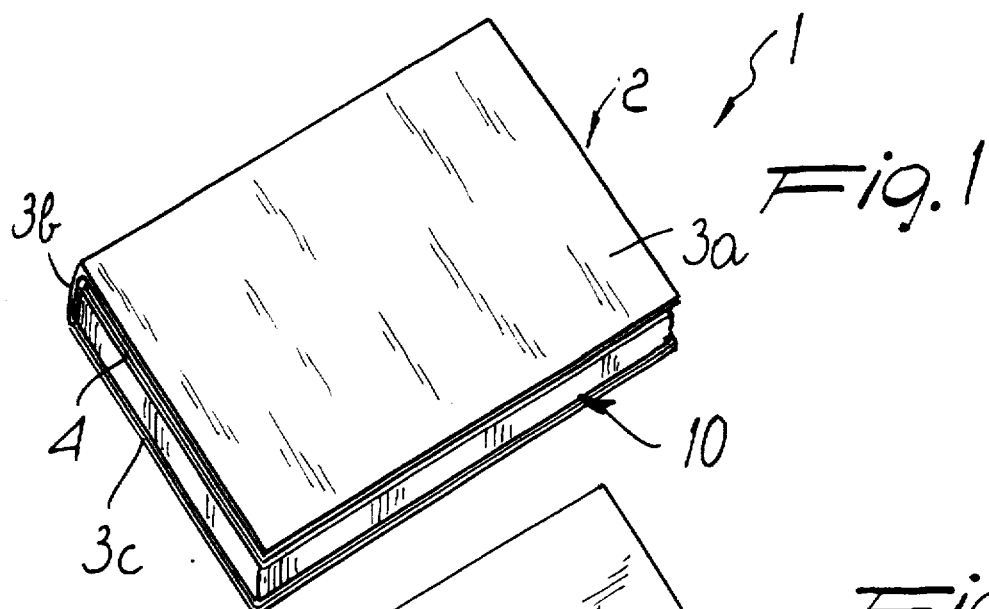
FIG. 1 is a schematic perspective view, in closed position, of a container for a plurality of discs according to the invention.

With reference to FIGS. 1 to 7, a container for a plurality of disc items, particularly for compact discs, according to the invention, is generally designated by the reference numeral 1 and comprises an outer case 2 provided with a front flap 3a which is connected, by means of a spine 3b, to a rear flap 3c.

Advantageously, sheets 4, joined in a booklet-like fashion to apply the necessary indications, can be applied onto the inner face of the front flap 3a, whereas a tray-like body, generally designated by the reference numeral 10, is provided on the inner face of the rear flap 3c.

The tray-like body 10 is connected to the flap 3c by interposing adhesive material or with other conventional methods that are accordingly not examined in detail herein; the tray 10 can furthermore be formed monolithically with the flap 3c.

Figure 2:
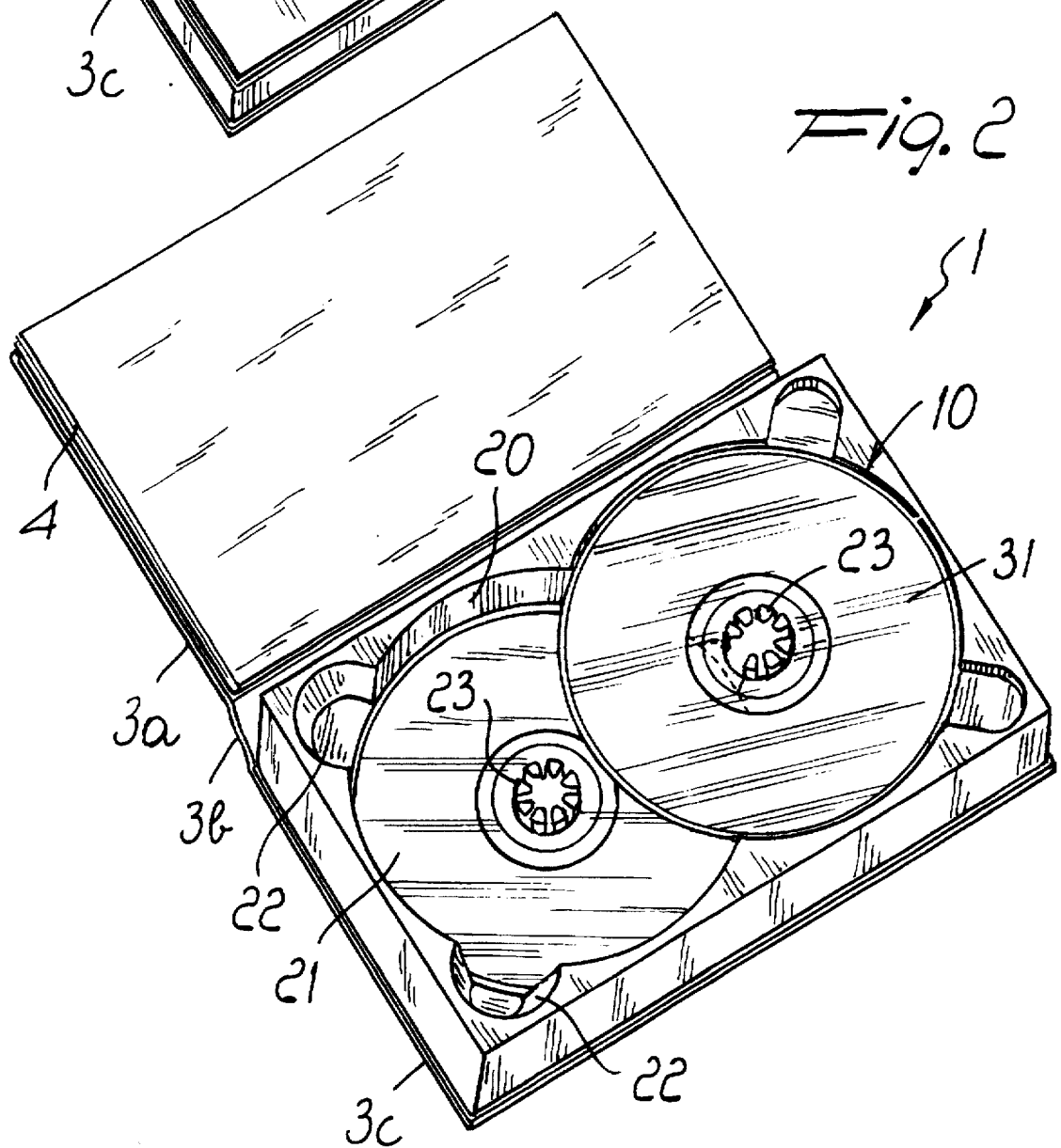
FIG. 2 is a schematic perspective view of a container for two discs, shown in open position.
Figure 12:
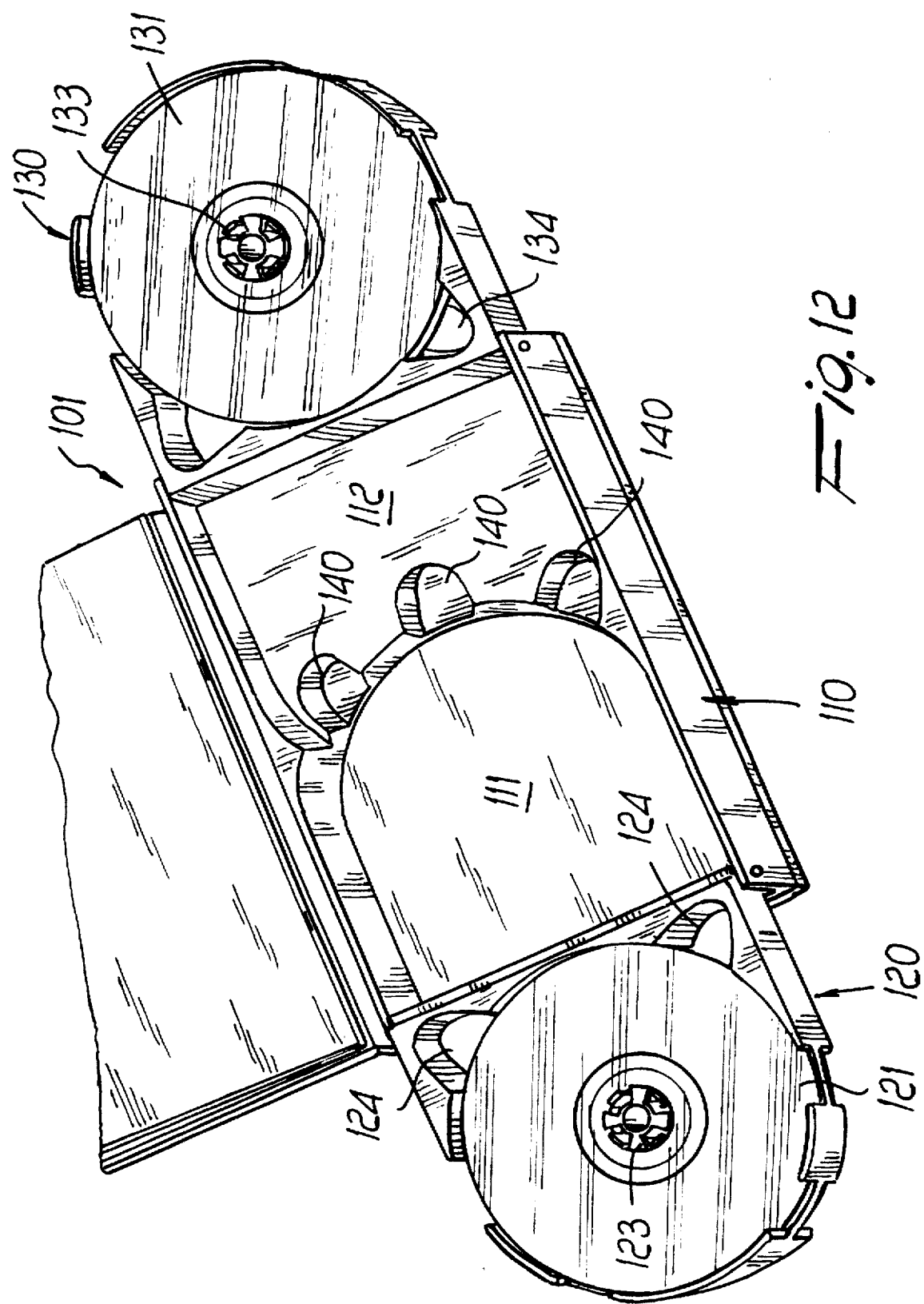
FIG. 12 is a perspective view of the container with both trays in swung-out position.

A feature of the invention is constituted by the fact, as shown in FIGS. 2 and 3, that the tray-like body 10 defines a first region 20 for accommodating a first compact disc 21; said region has, in a per se known manner, peripheral recesses 22 that allow to remove the disc 21, which is retained, in a per se known manner, by a coupling element 23 that acts axially.

A further feature of the invention is constituted by the fact that there is a second region 30 for accommodating a second compact disc 31, said region being arranged at a higher level than the first region 20.

The second compact disc 31 is furthermore arranged so as to partially overlap the first compact disc 21 and remain spaced therefrom, so that the user can, as shown schematically in dashed lines in FIG. 3, remove either disc without difficulty.

The partial overlapping of the discs, lying generally flat in the first 20 and second 30 regions respectively and in an offset manner while keeping them mutually spaced, allows to significantly reduce the overall size of the container and most of all to reduce its length-to-width ratio so as to be less than 2-to-1.

By the same constructive concept it is also possible to provide a container, shown in FIGS. 4 to 7, in which it is possible to simultaneously accommodate three discs.

In this case, a swing-out frame 40 is provided at the second region 30 and is pivoted at one edge of the tray, said frame supporting a second compact disc, again designated by the reference numeral 31, on one face, and a third compact disc, designated by the reference numeral 41, on the other face.

As clearly shown in the figures, in order to remove either one of the compact discs it is sufficient to overturn the frame 40.

For the sake of completeness in description, it should also be added that the conventional recesses allowing to insert a finger to remove the compact disc are provided both at the second region 30 and at the peripheral regions of the frame 40.

With reference to FIGS. 8 to 12, the container for a plurality of discs, particularly compact discs, according to the invention, which is generally designated by the reference numeral 101, comprises an outer case 102 having a front flap 103 connected to a rear flap 105 by means of a spine 104.

Preferably but not necessarily, sheets 106, bound in a booklet form for applying the necessary indications, can be provided on the inside face of the front flap 103, and a tray-like body, generally designated by the reference numeral 110, is provided on the inside face of the rear flap 105.

The tray-like body 110 is connected to the flap 105 by interposing adhesive material or with other conventional methods that allow to stably connect the tray-like body 110 to the cover 102.

An important feature of the invention is constituted by the fact that the tray-like body defines, at the bottom, a first flat surface 111 and a second flat surface 112 arranged side by side at different levels.

The container comprises a first swing-out frame, designated by the reference numeral 120, which is pivoted at a longitudinal end of the tray-like body 110 and supports, on opposite faces, two compact discs 121 and 122, which are retained in a per se known manner by the conventional central coupling 123.

Recesses 124 are formed on the opposite faces of the first frame and are located at the peripheral region of the discs 121 and 122, forming a grip element.

The first frame 120 can be arranged at the flat surface 111 and has such a thickness as to not rise above the level of the second flat surface 112.

A second frame 130 is pivoted at the opposite longitudinal end of the tray-like body 110 and supports a third compact disc and a fourth compact disc, designated by the reference numerals 131 and 132, which are also retained by a conventional central coupling 133.

In this case, too, the frame 130 has recesses, designated by the reference numeral 134, which are located at the peripheral region of the discs 131 and 132 to facilitate their removal.

The second frame 130 can be partially arranged on the flat surface 112, and its remaining part protrudes with respect to the flat surface 112 and arranges itself so as to overlap the first frame and be spaced therefrom.

For the sake of completeness in description, it should be added that semicircular recesses, designated by the reference numeral 140, are formed on the second flat surface 112 at the peripheral region of the first flat surface 111, and allow to grip the first frame 120 to swing it out.

With the above described arrangement, it is thus possible to accommodate four compact discs in a very compact container and to individually remove each compact disc.

From the above description it is thus evident that the invention achieves the intended aim and objects, and in particular the fact is stressed that with extremely simple constructive solutions, such as the provision of two regions at different levels for accommodating the first and second compact discs, which are partially superimposed and spaced, it is possible to reduce the overall size of the container without thereby compromising in any way the possibility of easily removing the compact discs. In particular, from the above disclosure and the enclosed figures, it is clear that in all of the embodiments, the accommodation regions 20, 30, 120, 130 are advantageously defined at opposite end parts of the tray-line body 10, 110 and extend up to the median part of the body where said two regions partially overlap. The body 10, 110 has thus an elongate configuration being confined by peripheral end walls, opposite to each other with respect to the median part, with the two accommodation regions opening onto a same side of the tray-like body. It will be thus noted that, even if superimposed, both in the variant when they are fixedly retained in the accommodation regions and in that in which they are fixedly retained in the swing-out frames provided as said regions, the discs are laying substantially tangentially to a respective peripheral end wall and are accessible to the user from the said same side of the tray-like body.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to the requirements.

What is claimed is:

1. A container for a plurality of identical disc items, the container comprising:

a tray-like body including a first end part, a second end part and a median part, said first and second end parts being opposite to each other with respect to said median part;

a first accommodation region being housed at said tray-like body to extend over said first end and median parts of the tray-like body, at least one first disc being accommodatable, to lay in a generally flat condition in said first disc receiving area;

a second accommodation region being housed at said tray-like body to extend over said second end and median parts of the tray-like body, at least one second disc being accommodatable to lay in a generally flat condition in said second disc receiving area, said first and second accommodation regions only partially overlapping at the median part of the tray-like body, and said at least one second disc being arrangeable at said second accommodation region spaced from, and partially overlapping said at least one first disc only at said median part of the tray-like body; and disc retention means provided at said first and second accommodation regions for retaining said discs in said partially overlapping configuration.

2. Container according to claim 1, further comprising a case that forms a front flap, said flap being joined to a rear flap by means of a spine, said tray-like body being associated to an inner face of said rear flap.

3. Container according to claim 2, wherein said tray-like body is formed monolithically with said rear flap.

4. Container according to claim 2, further comprising, on an inner face of said front flap, a plurality of sheets, said sheets being mutually joined so as to form a booklet.

5. Container according to claim 1, further comprising, at said first accommodation region and at said second accommodation region, recesses that are arranged peripherally to allow access for removing a disc.

6. Container according to claim 1, wherein in said second region a swing-out frame is provided which supports a second disc on a first face and a third disc on a second face thereof.

7. Container for a plurality of disc items, according to claim 1, wherein said tray-like body has, on its bottom, a first flat surface and a second flat surface, said first and second flat surfaces being arranged side by side and at different levels, said container comprising a first swing-out frame, pivoted to said tray and accommodatable at said first flat surface, and a second swing-out frame, pivoted to said tray and partially accommodatable on said second flat surface with a remaining part overlapping in an offset manner, and being spaced from, said first frame accommodated on said first flat surface, each one of said frames supporting two discs on opposite faces, and wherein said first and second swing-out framers provide said first and respectively second accommodation regions.

8. Container according to claim 7, wherein said first and second frames are pivoted at opposite ends of said tray.

9. Container according to claim 7, wherein said second flat surface has semicircular recesses located at peripheral regions of said first flat surface for allowing gripping of said first frame.

10. Container according to claim 1, wherein said disc retention means comprise coupling elements located respectively at said first and second accommodation regions for coupling said at least one first and second discs so as to lie in said regions in a generally flat condition, with said at least one second disc arranged in said second region so as to be spaced from, and to partially overlap said at least one first disc in an offset manner.

11. A container for a plurality of disc items, said container comprising:

a tray-like body having an elongate configuration with external dimensions in a length-to-width ratio being less than 2-to-1 and including a first peripheral end wall, a second peripheral end wall and a median part, the first and second end walls being opposite to each other with respect to said median part;

a first accommodation region being housed at said tray-like body between the first peripheral end wall and the median part of the tray-like body, at least one first disc being accommodatable, to lay in a generally flat condition in said first accommodation region substantially tangentially to said first peripheral end wall;

a second accommodation region being housed at said tray-like body between the second peripheral end wall and the median part of the tray-like body, at least one second disc being accommodatable, to lay in a generally flat condition in said second accommodation region substantially tangentially to said second peripheral end wall, the first and second accommodation regions only partially overlapping at the median part of the tray-like body, said at least one second disc being arrangeable at said second accommodation region to be spaced from, and partially overlapping said at least one first disc.

12. Container according to claim 11, further comprising a case that forms a front flap, said flap being joined to a rear flap by means of a spine, said tray-like body being associated to an inner face of said rear flap.

13. Container according to claim 12, wherein said tray-like body is formed monolithically with said rear flap.

14. Container according to claim 12, further comprising, on an inner face of said front flap, a plurality of sheets, said sheets being mutually joined so as to form a booklet.

15. Container according to claim 11, further comprising, at said first accommodation region and at said second accommodation region, recesses that are arranged peripherally to allow access for removing a disc.

16. Container according to claim 11, wherein in said second region a swing-out frame is provided which supports a second disc on a first face and a third disc on a second face thereof.

17. Container for a plurality of disc items, according to claim 11, wherein said tray-like body has, on its bottom, a first flat surface and a second flat surface, said first and second flat surfaces being arranged side by side and at different levels, said container comprising a first swing-out frame, pivoted to said tray and accommodatable at said first flat surface, and a second swing-out frame, pivoted to said tray and partially accommodatable on said second flat surface with a remaining part overlapping in an offset manner, and being spaced from, said first frame accommodated on said first flat surface, each one of said frames supporting two discs on opposite faces, and wherein said first and second swing-out frames provide said first and respectively second accommodation regions.

18. Container according to claim 17, wherein said first and second frames are pivoted at opposite ends of said tray.

19. Container according to claim 17, wherein said second flat surface has semicircular recesses located at peripheral regions of said first flat surface for allowing gripping of said first frame.

20. Container according to claim 11, wherein said disc retention means comprise coupling elements located respectively at said first and second accommodation regions for coupling said at least one first and second discs so as to lie in said regions in a generally flat condition, with said at least one second disc arranged in said second region so as to be spaced from, and to partially overlap said at least one first disc in an offset manner.

21. A container for a plurality of identical disc items, said container comprising:

an elongated tray-like body extending between first and second end peripheral walls thereof, the end walls being opposite to each other with respect to a median part of the tray-like body;

a first accommodation region being housed at said tray-like body between said first peripheral end wall and the median part thereof, at least one first disc being accommodatable, to lay in a generally flat condition in said first accommodation region;

a second accommodation region being housed at said tray-like body at a higher level than said first accommodation region between the second peripheral end wall and the median part of the tray like body, said second accommodation region only partially overlapping, at the median part of the tray-like body, said first accommodation region, at least one second disc being accommodatable to lay in a generally flat condition in said second accommodation region; and disc retention means provided at said first and second disc receiving areas to retain said at least one first and second discs in said first and second accommodation regions substantially tangent to said first and respectively second end walls, with said at least one second disc arranged at said second disc receiving area to be spaced from, and partially overlapping said at least one first disc.

22. A container and a plurality of identical disc items accommodatable therein, the container comprising:

a tray-like body;

a first accommodation region for accommodating at least one first disc;

a second accommodation region for accommodating at least one second disc, said first and second regions being housed at said tray-like body and opening onto a same side thereof for accommodating said identical discs, said at least one first and at least one second discs lying in a generally flat condition, with said at least one second disc arranged in said second region so as to be spaced from, and to partially overlap said at least one first disc in an offset manner.

* * * * *

(12) EX PARTE REEXAMINATION CERTIFICATE (6460th)

United States Patent
Pozzoli

(10) Number: US 5,743,390 C1
(45) Certificate Issued: Oct. 7, 2008

(54) CONTAINER FOR A PLURALITY OF DISCS, PARTICULARLY FOR COMPACT DISCS

(75) Inventor: Aldo Pozzoli, Inzago (IT)

(73) Assignee: Pozzoli S.p.A., Inzago (Milan) (IT)

Reexamination Request:
No. 90/008,773, Jul. 25, 2007
No. 90/008,796, Jul. 30, 2007

Reexamination Certificate for:
Patent No.: 5,743,390
Issued: Apr. 28, 1998
Appl. No.: 08/783,297
Filed: Jan. 10, 1997

Related U.S. Application Data

(63) Continuation of application No. 08/498,494, filed on Jul. 5, 1995, now abandoned.

(30) Foreign Application Priority Data

Jul. 15, 1994 (IT) .................................. MI94A1490
Jan. 19, 1995 (IT) .................................. MI950025 U

(51) Int. Cl.
*B65D 69/00* (2006.01)
*B65D 71/00* (2006.01)
*B65D 85/57* (2006.01)

(52) U.S. Cl. .................. 206/232; 206/303; 206/308.1; 206/445

(58) Field of Classification Search ................ None
See application file for complete search history.

(56) References Cited

U.S. PATENT DOCUMENTS 4,289,235 A   9/1981   Egly
5,407,067 A   4/1995   Cotter et al.

FOREIGN PATENT DOCUMENTS

| GB | 2187442 | 9/1987 |
| JP | 63-7692 | 1/1988 |
| JP | 61-59585 | 1/1988 |
| JP | S63-7692 | 1/1998 |

*Primary Examiner*—Aaron J. Lewis

(57) ABSTRACT

The present invention relates to a container for a plurality of discs, particularly compact discs, which comprises a tray-like body having, on its bottom, a first flat surface and a second flat surface arranged side by side and at different levels. The container comprises a first swing-out frame, pivoted to the tray and accommodatable at the first flat surface, and a second swing-out frame, pivoted to the tray and partially accommodatable on the second flat surface so that the remaining part overlaps, and is spaced from, the first frame accommodated on the first flat surface. Each frame supports two discs on opposite faces.

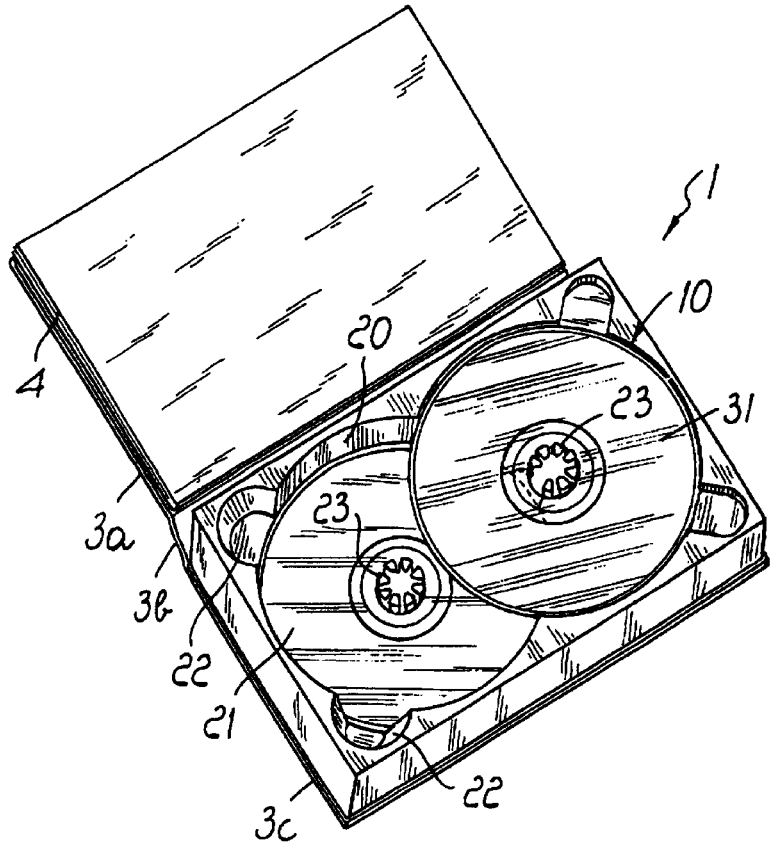

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–21 is confirmed.

Claim 22 is cancelled.

Claim 1 is determined to be patentable as amended.

Claims 2–10, dependent on an amended claim, are determined to be patentable.

1. A container for a plurality of identical disc items, the container comprising:

a tray-like body including a first end part, a second end part and a median part, said first and second end parts being opposite to each other with respect to said median part;

a first accommodation region being housed at said tray-like body to extend over said first end and median parts of the tray-like body, at least one first disc being accommodatable, to lay in a generally flat condition in said first disc receiving area;

a second accommodation region being housed at said tray-like body extend over said second end and median parts of the tray-like body, at least one second disc being accommodatable to lay in generally flat condition in said second disc receiving area, said first and second accommodation regions only partially overlapping at the median part of the tray-like body, and said at least one second disc being arrangeable at said second accommodation region spaced from, and partially overlapping said at least one first disc only at said median part of the tray-like body; and disc retention means provided at said first and second accommodation regions for *axially* retaining said discs in said partially overlapping configuration.

* * * * *